(12) United States Patent
Collins et al.

(10) Patent No.: US 9,556,992 B1
(45) Date of Patent: Jan. 31, 2017

(54) APPARATUS FOR MULTIPLE METER INSTALLATION

(71) Applicants: Steven Josh Collins, Bowling Green, KY (US); Danny Lewis Young, Alvaton, KY (US)

(72) Inventors: Steven Josh Collins, Bowling Green, KY (US); Danny Lewis Young, Alvaton, KY (US)

( * ) Notice: Subject to any disclaimer, the term of this patent is extended or adjusted under 35 U.S.C. 154(b) by 13 days.

(21) Appl. No.: 14/636,702

(22) Filed: Mar. 3, 2015

(51) Int. Cl.
*F16L 41/00* (2006.01)
*G01F 15/18* (2006.01)

(52) U.S. Cl.
CPC .............. *F16L 41/008* (2013.01); *G01F 15/18* (2013.01); *G01F 15/185* (2013.01); *Y10T 137/0413* (2015.04); *Y10T 137/5997* (2015.04)

(58) Field of Classification Search
CPC ....... F16L 41/008; G01F 15/18; G01F 15/185; Y10T 137/87877; Y10T 137/5997; Y10T 137/0447; Y10T 137/0413; F16K 11/20; F16K 11/22
USPC ......... 137/883, 315.06, 15.03, 15.09; 73/201
See application file for complete search history.

(56) References Cited

U.S. PATENT DOCUMENTS

| | | | | |
|---|---|---|---|---|
| 2,018,615 A | * | 10/1935 | Lofton | G01F 25/0007 73/201 |
| 3,272,009 A | * | 9/1966 | Leopold, Jr. | G01F 15/185 137/15.03 |
| 4,549,751 A | * | 10/1985 | Grove, Jr. | G01F 15/18 285/30 |
| 6,860,286 B2 | * | 3/2005 | Doan | E03B 7/04 73/201 |
| 8,109,297 B2 | * | 2/2012 | Cimberio | E03B 7/072 137/315.06 |

OTHER PUBLICATIONS

Mueller Co. Ltd, "Copper Meter Yokes With Horizontal Inlet and Outlet", Feb. 2011, pp. 8A.1-8A.52, catalog.

* cited by examiner

*Primary Examiner* — Michael R Reid
(74) *Attorney, Agent, or Firm* — Middleton Reutlinger

(57) ABSTRACT

An apparatus for installing multiple utility meters is provided. The apparatus may be attachable to an existing setter in place of a utility meter. The apparatus includes connectors for a plurality of utility meters, wherein one of the utility meters attaches such that intake into the meter and outtake out of the meter utilize the setter. The apparatus may include connectors for one or more additional meters and secondary outtakes for each of the additional meters.

10 Claims, 10 Drawing Sheets

APPARATUS FOR MULTIPLE METER INSTALLATION

TECHNICAL FIELD

Present embodiments are directed generally to a device to allow for multiple utility meters and outputs. More particularly, various inventive methods and apparatus disclosed herein relate to a device that replaces a utility meter with two utility meters and includes a second output.

BACKGROUND

When an additional metered water output is required at a property that is adjacent to a property that already has metered water, a second line is often required for the new output and a second meter. This commonly requires tapping off of a main water line in a second place, a task that requires shutting off the water main, digging a location for the second output, and installing piping for the second metered utility output.

SUMMARY

The present disclosure is directed to an apparatus for adding a second meter and output to an existing metered water output. The apparatus is installed in place of a meter, and allows for two meters to be installed. One of the meters is attached to the apparatus such that the meter measures water flow of a first stream, the apparatus configured to allow the first stream to enter the device from the upstream end of an existing setter and to exit the device to the downstream end of the setter. The second meter is attached to the apparatus and a second output line is created that utilizes the original output, runs the water through the second meter, and exits the apparatus via a secondary output.

According to some embodiments, an apparatus for multiple meter installation comprises a center bar having an upstream end and a downstream end. A splitter at the upstream end of the center bar, the splitter has an upstream portion in flow communication with a first downstream portion and a second downstream portion. A first meter upstream connector is in flow communication with the first downstream portion of the splitter. A second meter upstream connector is in flow communication with the second downstream portion of the splitter. The apparatus further comprises a first meter downstream connector and a second meter downstream connector. One of the first and second meter downstream connectors may be connected at the downstream end of the center bar, and the other of the first and second downstream connectors may be spaced from one of the first and second meter upstream connector. A connection is located at a downstream end of the center bar, the connection in fluid communication with one of the first and second meter downstream connector, the other of the first and second meter downstream connector being spaced from the connection.

According to some embodiments, an apparatus for multiple meter connection may comprise a center bar having an upstream end and a downstream end. The center bar may be sized such that a distance from the upstream end to the downstream end is approximately the size of an existing meter. The apparatus may further comprise a splitter, the splitter having a single upstream portion and a first downstream portion and a second downstream portion, wherein the splitter is connected to the upstream end of the center bar. A first meter upstream connector may be connected to the first downstream portion of the splitter by a first upstream conduit. a first meter downstream connector, said first meter downstream connector connected to a first end of a first meter downstream conduit, said first meter downstream connector positioned such that a first meter is connectable between said first meter upstream connector and said first meter downstream connector, a second meter upstream connector, the second meter upstream connector connected to the second downstream portion of the splitter by a second upstream conduit. A second meter downstream connector positioned such that a second meter is connectable between the second meter upstream connector and the second meter downstream connector. A second meter downstream conduit has a first end and a second end, the first end of the second meter downstream conduit may be connected to the second meter downstream connector, and the second end of the second meter downstream conduit may be attachable to a secondary downstream outlet.

According to still further embodiments, an apparatus for connection of an additional water meter to a water meter setter comprises a bar having an upstream connector and a downstream connector. The upstream connector is in flow communication with the water meter setter and the downstream connector is in flow communication with the water meter setter. A flow splitter in communication with the upstream connector, said flow splitter directing fluid flow through a first flow path having a first water meter and a second flow path having a second water meter. One of the first and second flow paths moving through a setter outtake of the setter and the other of the first and second flow paths moving through a secondary downstream outlet.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosed embodiments.

DETAILED DESCRIPTION

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, certain embodiments of the setter device disclosed herein are particularly well suited for utilization in place of a water meter that was initially attached to an existing setter. However, one or more aspects of the setter described herein may be utilized in combination with other piping setups and implementation of the one or more aspects described herein in combination with alternatively configured utility piping is contemplated without deviating from the scope or spirit of the claimed invention. For example, in some embodiments the setter may be utilized for an alternate utility (such as natural gas) and/or the device may have additional and/or alternative features.

In some embodiments, the apparatus may replace an existing water meter by removing the water meter from a setter and attaching the apparatus to the setter. The apparatus allows for two water meters to be placed in communication with the intake fluid flow entering the apparatus from the upstream end of the setter, and utilizing the existing output of the existing setter and a second new output, which may run through a new meter.

Referring initially to FIGS. 1A-1G, an embodiment of the apparatus 100 is provided. The apparatus 100 includes a center bar 105. The center bar 105 has a center bar upstream end 105A and a center bar downstream end 105B. The center bar 105 is sized to approximate the size of meter, for example an existing meter or a second meter. In the illustrated embodiment, the center bar upstream end 105A and the center bar downstream end 105B are both illustrated as threaded ends that may each be attached to a conduit. For example, center bar upstream end 105A may be attachable to the upstream end of an existing setter 200 (FIG. 4) via a connector 106A. Likewise, the center bar downstream end 105B may be attachable to the downstream end of an existing setter 200 via a connector 106B.

Figure 4:
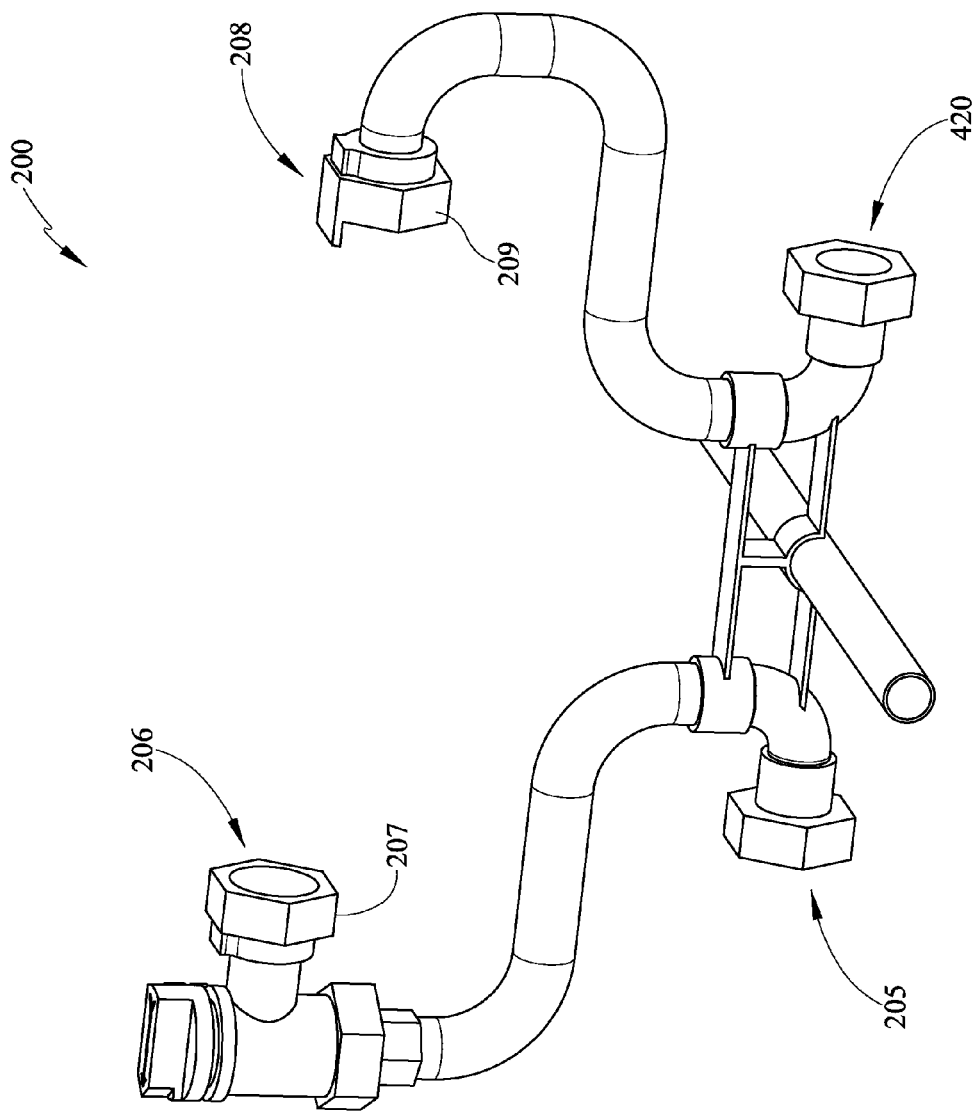
FIG. 4 is a side perspective view of an exemplary meter setter.

Referring briefly to FIG. 4, an exemplary setter 200 is depicted is shown in a side perspective. The setter 200 is a horizontally mounted setter, but alternatively vertically mounted setters may be utilized. The setter is generally position in a line extending between the water main and the customer inlet, for example at a residential or commercial location where water service is provided. The setter 200 provides a location where a water meter may be disposed to monitor water usage. The setter 200 is shown for purpose of understanding how the apparatus 100 is connected to an existing setter to provide the functionality of adding a second meter to an existing water line, without the need to dig substrate back to the a main water service line. The setter 200 includes a setter intake 205 which is connected to a water main service and a setter outlet or outtake 420 which is connected to a customer service line, for example extending into a customer residential or commercial structure. Above the setter intake 205, and in fluid communication therewith, is a center bar upstream connector 206. Likewise, above the setter outlet or setter outtake 420 is a center bar downstream connector 208. The connectors 206, 208 include exemplary meter nuts 207, 209 which are normally used to connect to a water meter. In the instant embodiment however, the center bar 105 (FIG. 1A) of apparatus 100 is disposed between the center upstream connectors 206, 208. As a result of this arrangement, an additional meter may be added to the apparatus 100 without the need to dig the surrounding substrate near the water main service line.

Referring again to FIGS. 1A-1G, a support bar 175 extends from center bar 105 and attaches to the second meter downstream end piping 165. In some implementations, support bar 175 may be attached to one or more alternate components and/or secondary downstream outlet 170 may be attached to the apparatus by one or more alternate support structures, for example brace 176.

Center bar upstream end 105A includes a passage that forms a pathway for fluid flow to conduit splitter 110. Conduit splitter 110 is a conduit that may receive a fluid via center bar upstream end 105A and split the fluid stream into multiple streams. In the illustrated embodiment, conduit splitter 110 divides fluid entering the connector 106A at the center bar upstream end 105A into two streams; however, other embodiments are contemplated where conduit splitter 110 may split a fluid stream into additional streams. For example, additional embodiments are contemplated where conduit splitter 110 may split a fluid stream entering center bar upstream end 105A into three or more streams. Conduit splitter 110 includes a single upstream end that is attached to and receives fluid from center bar upstream end 105A. Conduit splitter 110 includes two downstream portions, which are connected to first upstream conduit 120 and second upstream conduit 115. Fluid entering the conduit splitter 110 is split into two streams at the downstream portions of the conduit splitter 110, with part of the stream continuing to first upstream conduit 120 and a second part of the stream continuing to second upstream conduit 115.

First upstream conduit 120 receives a fluid stream from the first downstream portion of the conduit splitter 110 and directs the fluid stream through first shutoff valve 130 and then through first meter upstream connector 140. First shutoff valve 130 may be positionable to allow for fluid flowing through first upstream conduit 120 to be blocked and/or to limit the flow of the stream. For example, first shutoff valve 130 may be rotated 90 degrees or 180 degrees to control fluid flow from first upstream conduit 120 to first meter upstream connector 140.

Second upstream conduit 115 may receive a fluid stream from the second downstream portion of the conduit splitter 110 and direct the fluid stream through second shutoff valve 125 and then through second meter upstream connector 135. Second shutoff valve 125 may be positionable to restrict, limit, and/or regulate fluid flow from second upstream conduit 115 to second meter upstream connector 135 in a similar manner as first shutoff valve 130.

First meter upstream connector 140 may receive an upstream end of a utility meter. For example, a utility meter may be attached to first meter upstream connector 140 to receive fluid flow from first upstream conduit 120. In some implementations, a utility meter may have a threaded upstream end that may be received by first meter upstream connector 140 and tightened into place to allow fluid to flow from first meter upstream connector 140 and through the connected utility meter. In some implementations, first meter upstream connector 140 may receive a threaded upstream end of a utility meter that is threaded substantially similar to center bar upstream end 105A. For example, a utility meter may be initially attached to a setter 200, removed from the setter 200, center bar upstream end 105A may be attached to the upstream end connector 206 of the setter, and the previously attached meter may be attached to the apparatus 100 between the first meter upstream connector 140 and first meter downstream connector 160, as described below. A second meter upstream connector 135 may be similarly designed. For example, the upstream end of a utility meter may be connected to the apparatus 100 between the second meter upstream connector 135 and the second meter downstream connector 155, as described below. In some implementations, first upstream conduit 120 and second upstream conduit 115 may be angled such the first meter upstream connector 140 and second meter upstream connector 135 are parallel to each other and/or parallel to center bar 105. In some implementations, first meter upstream connector 140 may be aligned longitudinally parallel with first meter downstream connector 160 and/or aligned such that a utility meter may be connected between first meter upstream connector 140 and first meter downstream connector 160. Similarly, second meter upstream connector 135 and second meter downstream connector 155 may be aligned longitudinally and/or positioned to allow for a utility meter to be connected between the two connections.

Figure 1A:
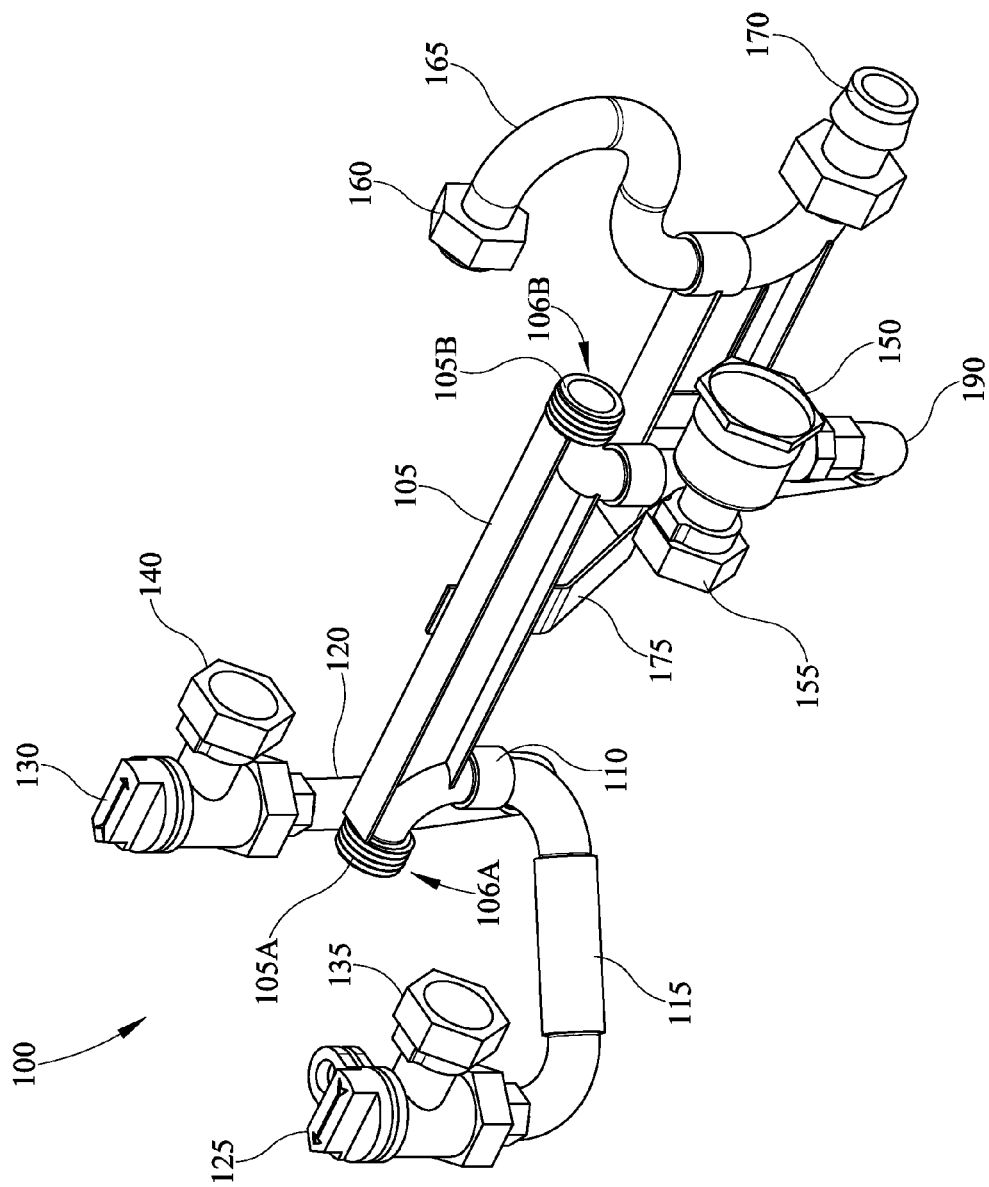
FIG. 1A illustrates a perspective view of one embodiment of the apparatus.
Figure 1B:
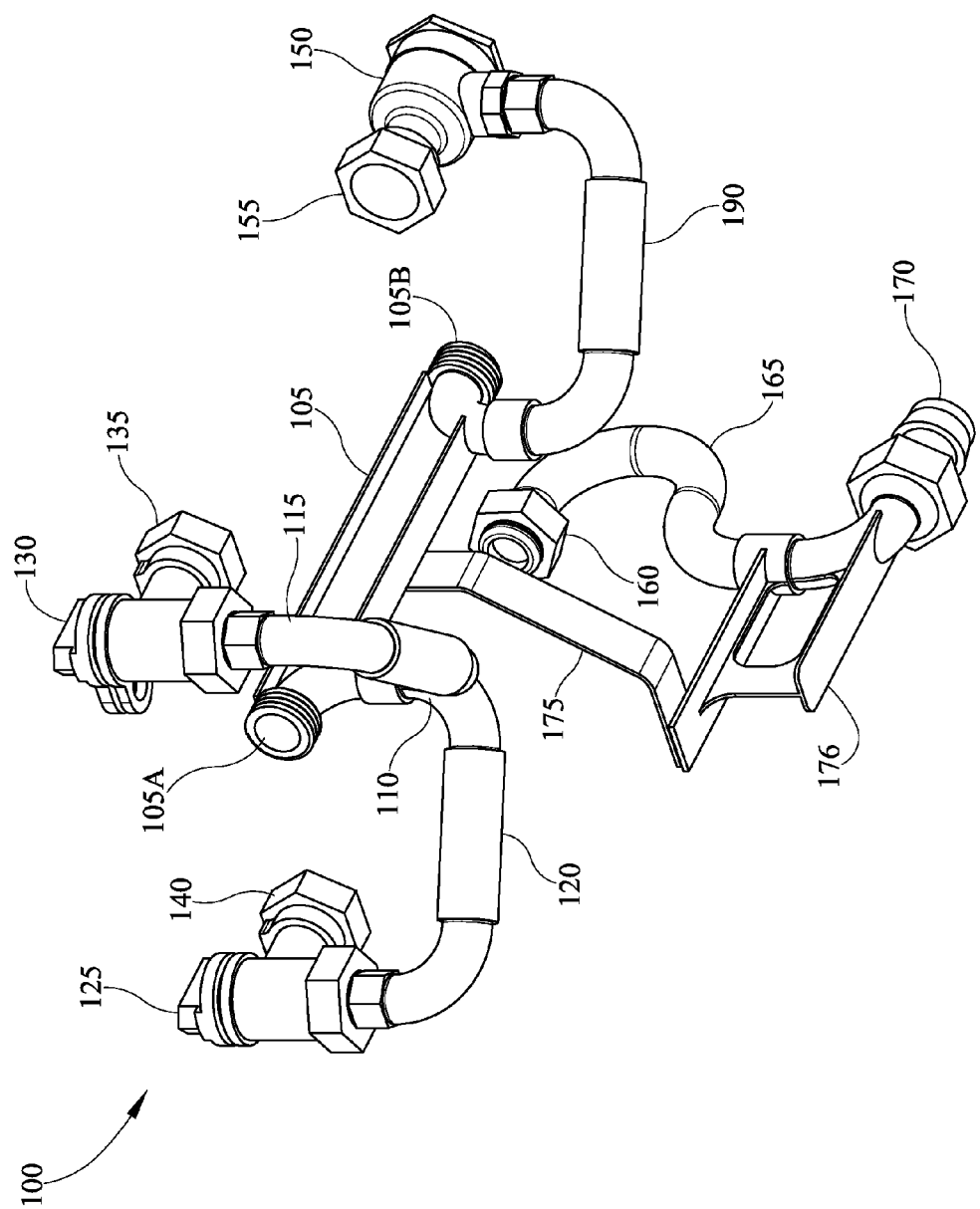
FIG. 1B illustrates a second perspective view of the apparatus.
Figure 1C:
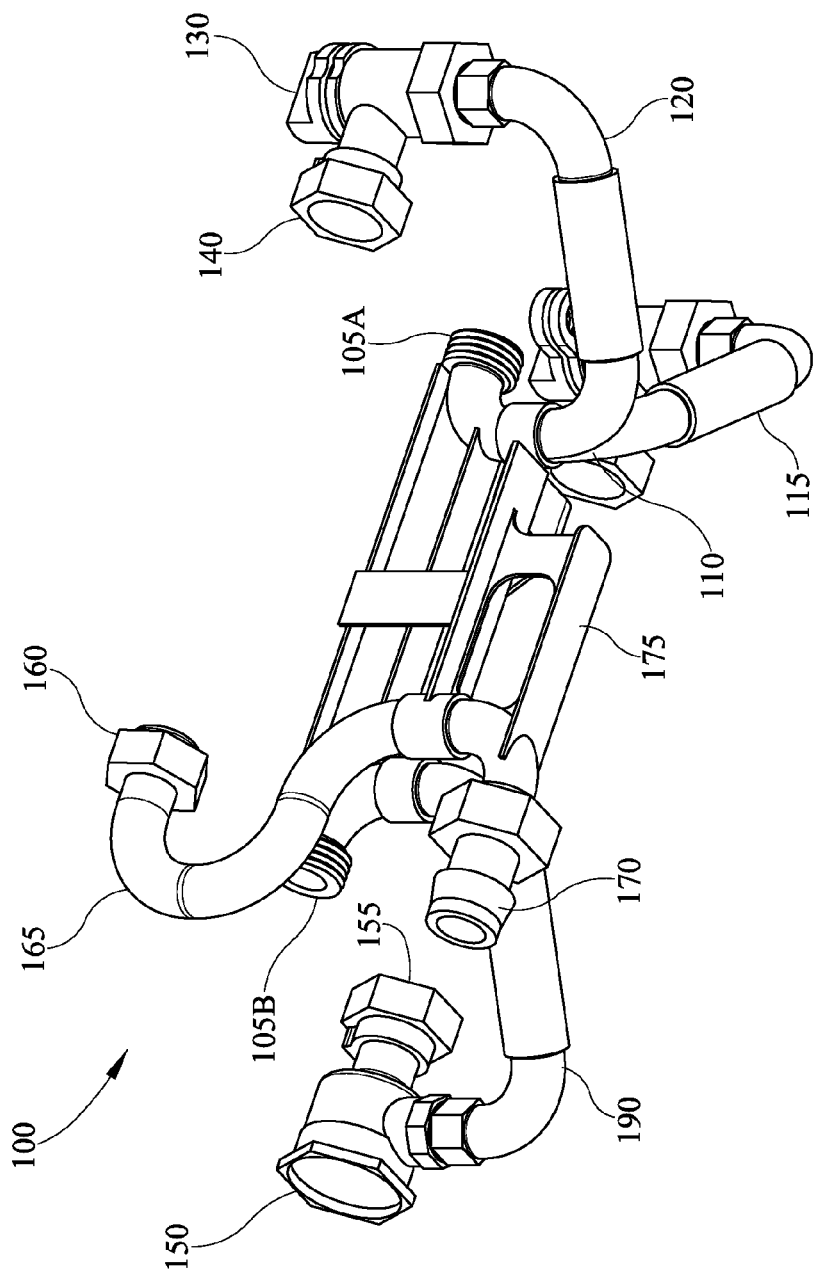
FIG. 1C illustrates a third perspective view of the apparatus.
Figure 1D:
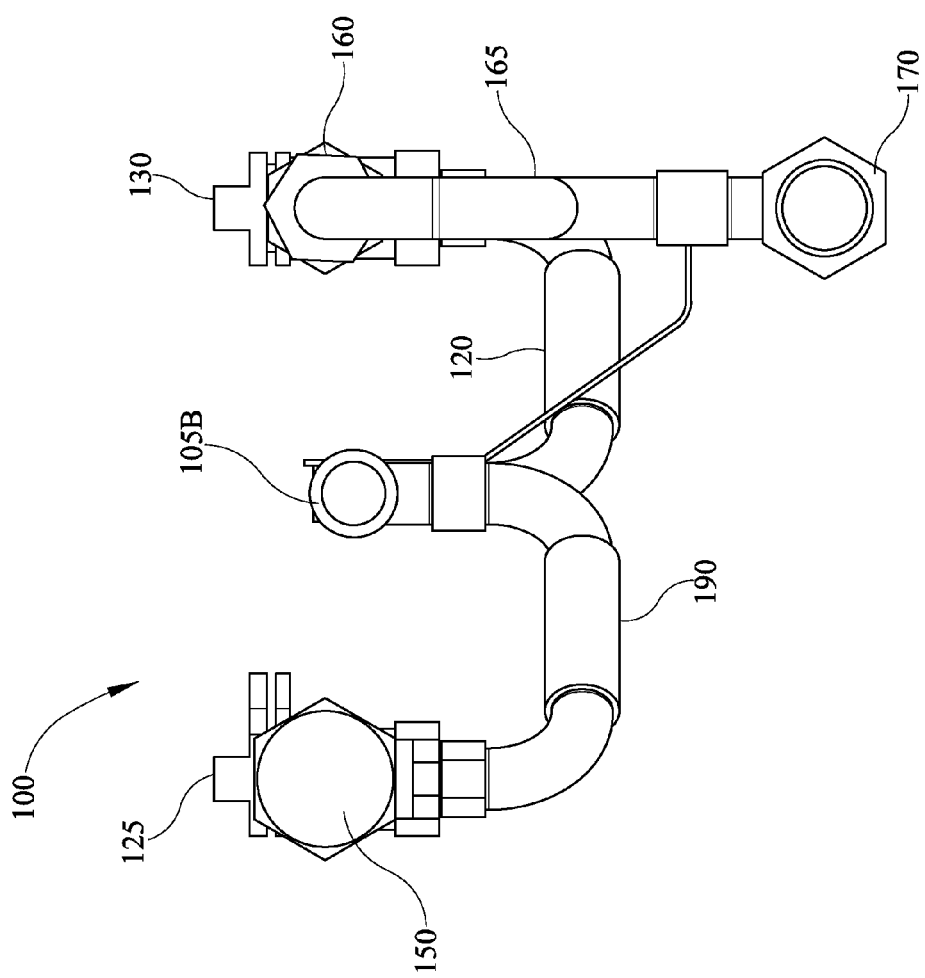
FIG. 1D illustrates a side view of the apparatus.
Figure 1E:
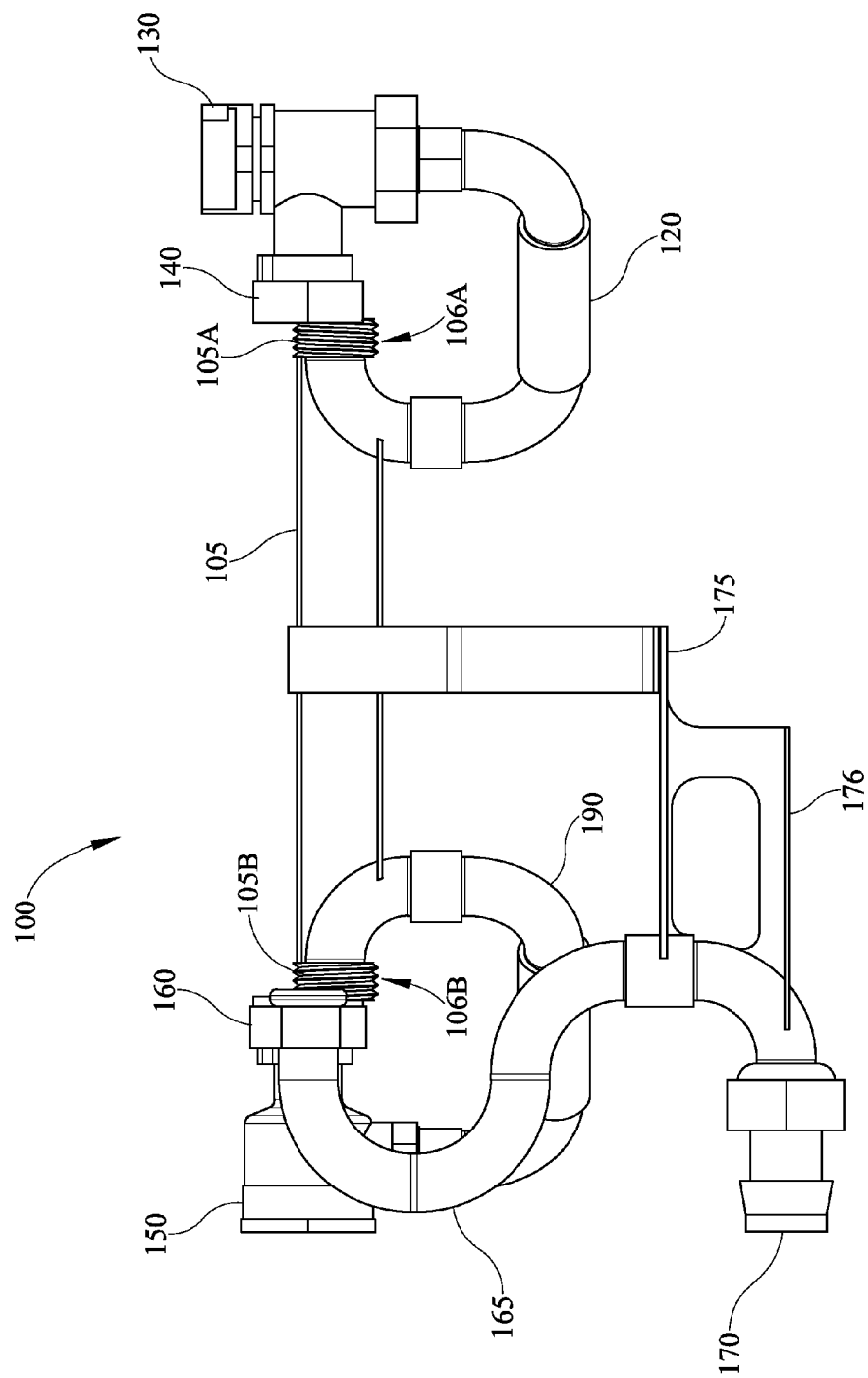
FIG. 1E illustrates another side view of the apparatus.
Figure 1F:
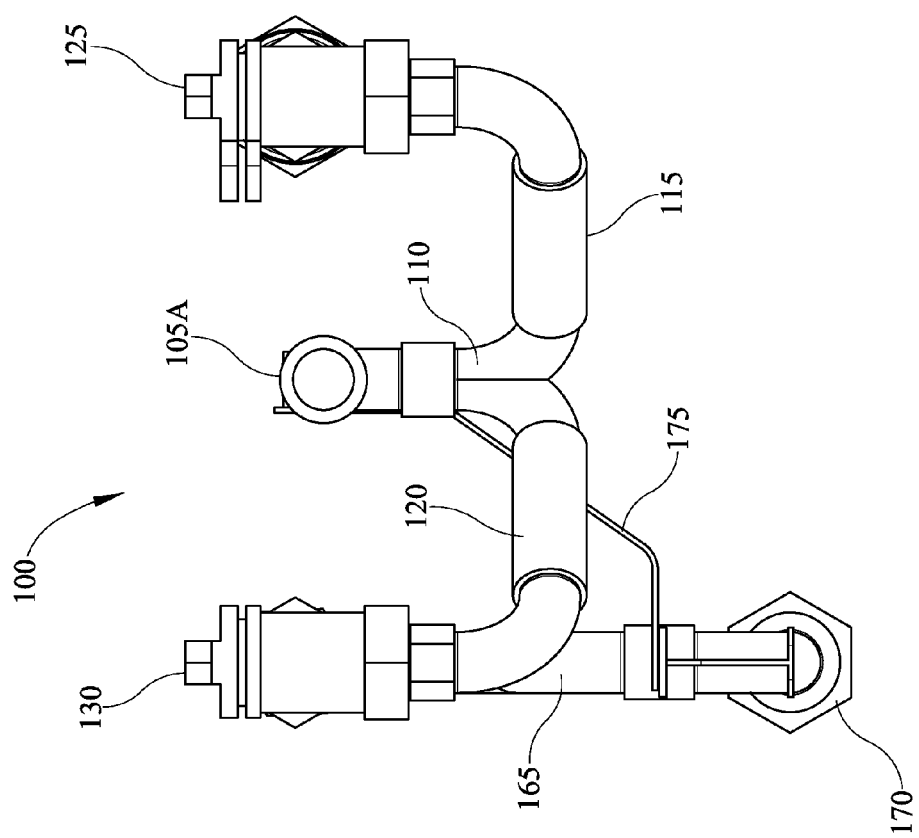
FIG. 1F illustrates a third side view of the apparatus.
Figure 1G:
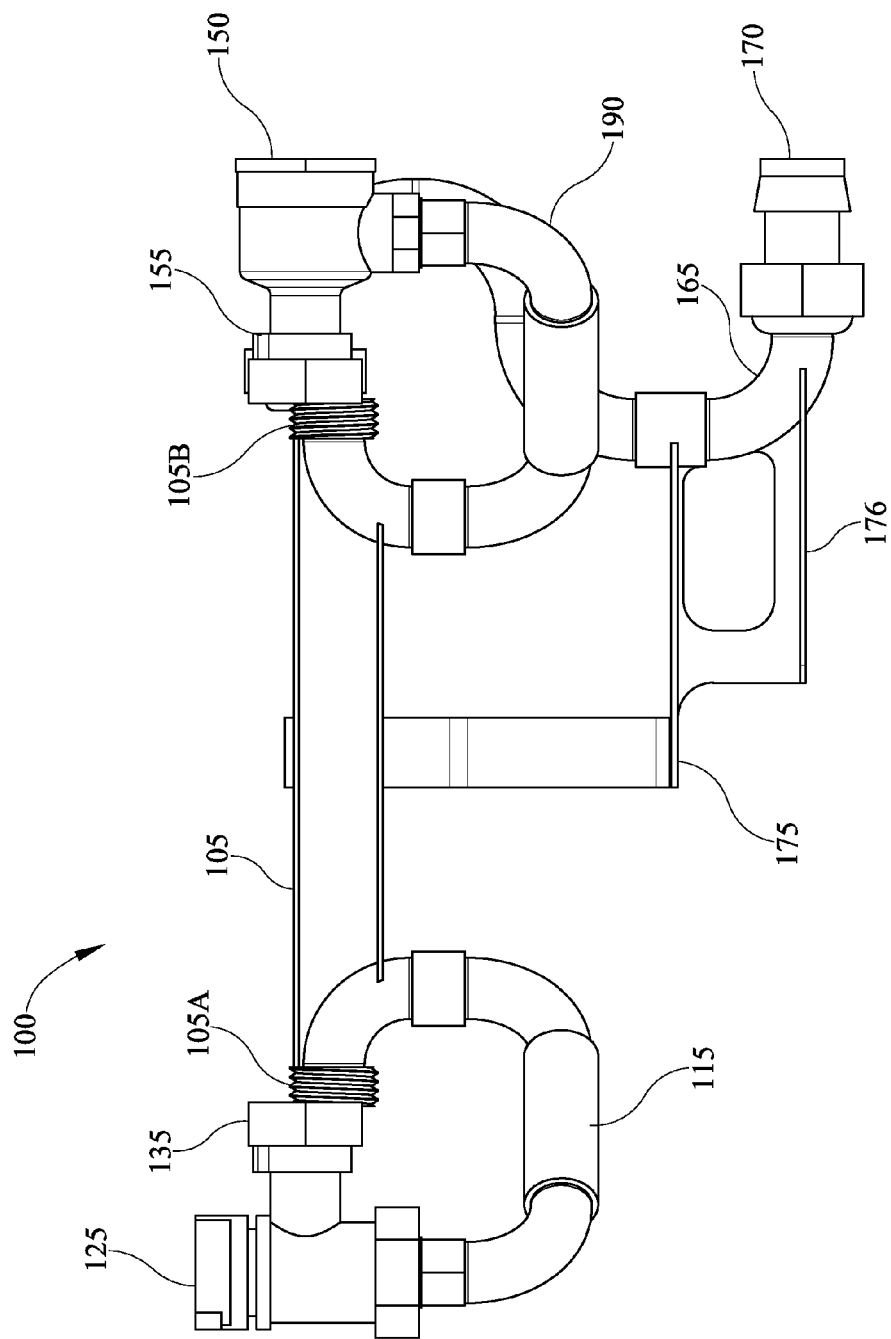
FIG. 1G illustrates a fourth side view of the apparatus.
Figure 2:
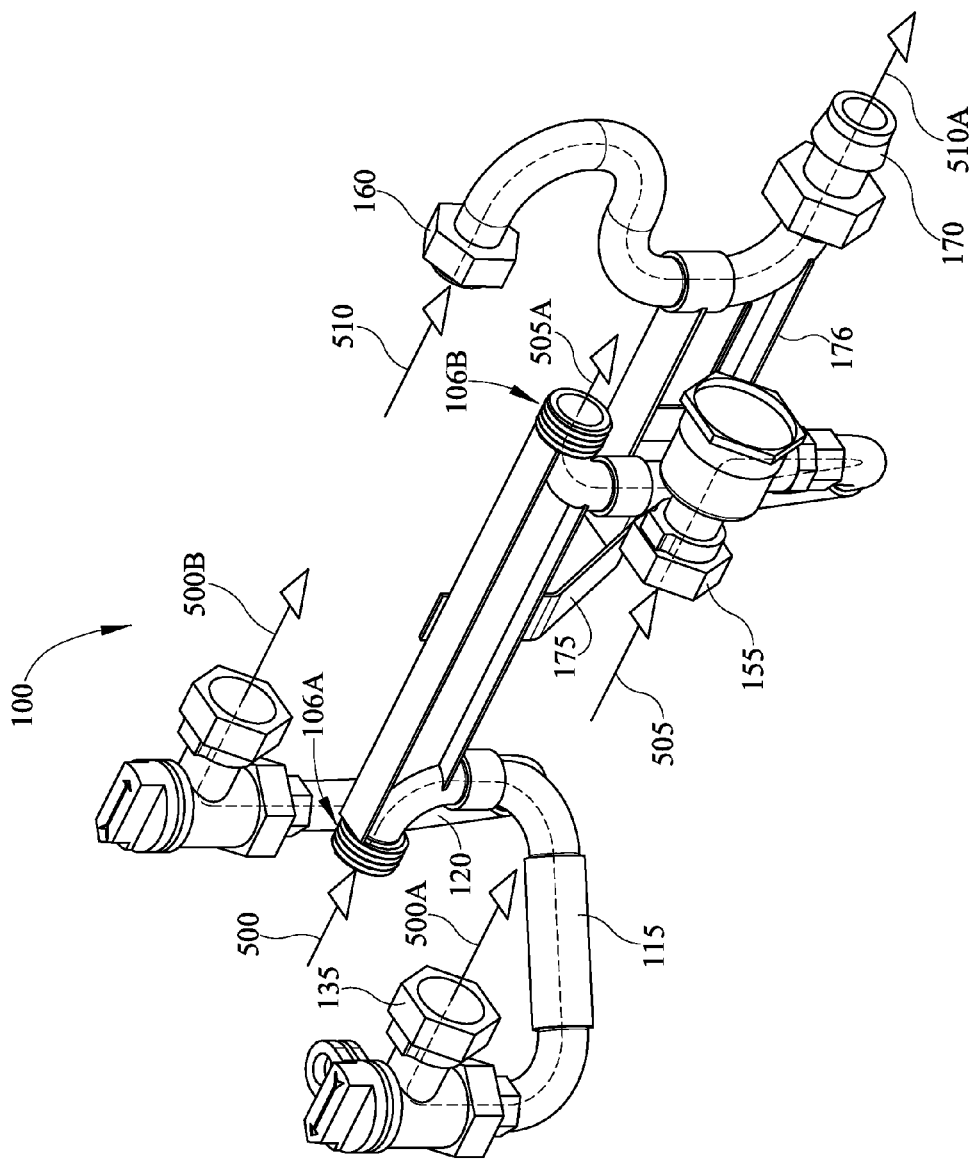
FIG. 2 illustrates flow of fluid into, through, and out of the apparatus.

Referring to FIG. 2, an illustration of the apparatus 100 is provided with arrows representing fluid flow through the apparatus 100 when connected to a fluid source. In the illustration, fluid flow is denoted by arrows with the larger arrowheads, with fluid flow through or within conduits and components denoted by dotted lines extending through the respective conduit. Primary upstream fluid flow 500 is received by center bar upstream end 105A and is split into two streams, which flow through first upstream conduit 120 and second upstream conduit 115. The fluid route ends at first meter upstream connector 140 and second meter upstream connector 135. The fluid stream then exits the apparatus, shown as first stream 500B and second stream 500A.

Figure 3:
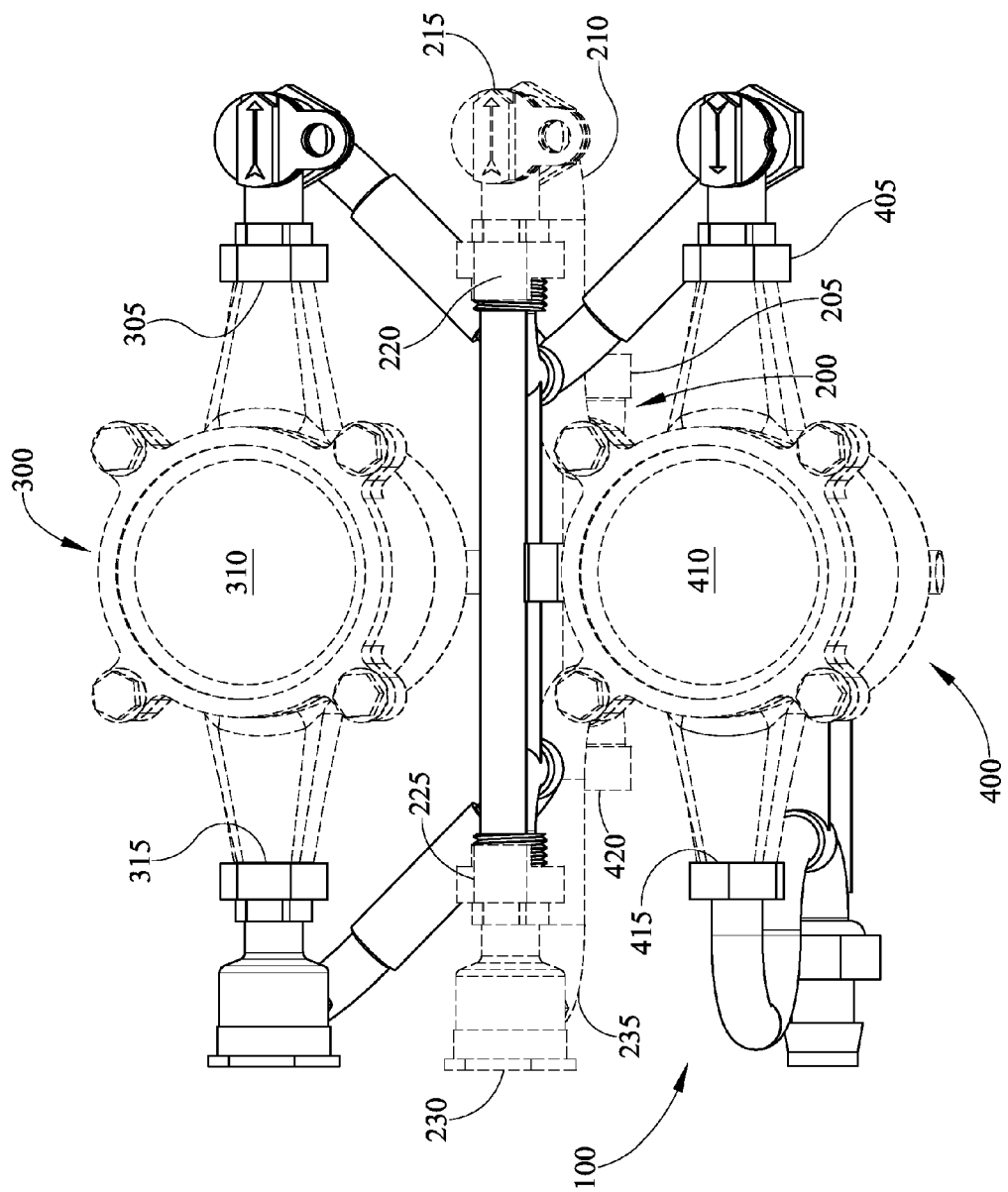
FIG. 3 is a top view of the apparatus attached to a setter and two utility meters.

Referring again to FIGS. 1A through 1G, first meter downstream connector 160 may receive a downstream end of a utility meter 400 (FIG. 3). For example, the downstream end of the utility meter may be threaded and may be received by first meter downstream connector 160. First meter downstream connector 160 is in fluid flow communication with first downstream conduit 165. First downstream conduit 165 may be angled such that first meter downstream connector 160 is longitudinally parallel with first meter upstream connector 140 such that a utility meter may be connected between first meter upstream connector 140 and first meter downstream connector 160. In some implementations, first meter upstream connector 140 and first meter downstream connector 160 may have one or more alternate configurations that allow for a utility meter may be connected such that a passage of fluid may flow from center bar upstream end 105A to conduit splitter 110 to first upstream conduit 120 to first meter upstream connector 140, through the utility meter, to first meter downstream connector 160 to first downstream conduit 165, and exit the apparatus at secondary downstream outlet 170. Secondary downstream outlet 170 may be configured such that additional conduits may be attached, thus allowing for an additional outlet. For example, secondary downstream outlet 170 may be connected to piping to a second destination separate from the first destination that is connected to and supplied by center bar downstream end 105B. Support bar 175 is connected to first downstream conduit 165 as a support to orient the first meter downstream connector 160 to receive a downstream end of a utility meter.

Second meter downstream connector 155 is configured to receive a downstream end of a second utility meter. For example, second meter downstream connector 155 may be configured to receive a threaded downstream end of a utility meter. When a utility meter 310 (FIG. 3) is connected to second meter upstream connector 135 and to second meter downstream connector 155, fluid may flow from second upstream conduit 115 through second meter upstream connector 135 and then through the utility meter to second meter downstream connector 155. Second meter downstream conduit 190 is in communication with second meter downstream connector 155 via second meter backflow preventer 150 such that fluid may flow though second meter downstream connector 155, through second meter backflow preventer 150, and then through second meter downstream conduit 190. Second meter backflow preventer 150 may restrict flow of fluid to one direction such that fluid may flow from second meter downstream connector 155 to second meter downstream conduit 190, but may be prevented from flowing from second meter downstream conduit 190 to second meter downstream connector 155.

The connector 106B at the center bar downstream end 105B includes a passage that is attached to second meter downstream conduit 190. Second meter downstream conduit 190 is connected to center bar downstream end 105B on a first end such that fluid may flow through center bar downstream end 105B, from second meter downstream conduit 190. Center bar downstream end 105B may be configured to be received by a setter. For example, center bar downstream end 105B may be threaded, as shown, and may be received by a setter with a threaded connector. In some implementations, second meter downstream connector 155 and first meter downstream connector 160 may be configured to have a similar shape as a downstream connector of a setter and center bar downstream end 105B may be substantially similar to a downstream end of a setter.

Referring again to FIG. 2, a fluid may enter first meter downstream connector 160, denoted by arrowed line 510, and exit the apparatus at 510A. Similarly, fluid 505 may enter second meter downstream connector 155 and exit the apparatus at connector 106B as fluid 505A. A meter 310 (FIG. 3) connected to second meter upstream connector 135 and to second meter downstream connector 155 may allow for fluid 500 to flow in at center bar upstream end 105A, through the apparatus 100, and to exit at center bar downstream end 105B as fluid 505A. A meter 400 (FIG. 3) connected to first meter upstream connector 140 (FIG. 1A) and to first meter downstream connector 160 (FIG. 1A) may allow fluid 500 to enter at center bar upstream end 105A, flow through the apparatus 100, and to exit the apparatus at secondary downstream outlet 170 as fluid 510A.

Referring to FIG. 3, the apparatus 100 connected to a setter and two meters is illustrated. The first meter 400, the second meter 300, and the setter 200 are illustrated with broken lines. The illustration shows the apparatus 100 attached to setter 200, first meter 400, and second meter 300. To aid in illustration, the components of apparatus 100 are not labeled; however, the components of apparatus 100 illustrated in FIG. 3 retain the same numbering as the apparatus 100 illustrated in FIGS. 1A through 1G.

Setter intake 205 is connected to setter upstream conduit 210 at a first end, and allows fluid flow from setter intake 205 to the setter shutoff valve 215, which is connected to the setter upstream conduit 210 at a second end. Setter shutoff valve 215 may allow a fluid stream to be regulated. For example, setter shutoff valve 215 may be rotatable so that, when positioned in a particular orientation, fluid flow is blocked from passing through setter shutoff valve 215. Setter upstream connector 220 is connected to setter shutoff valve 215 to receive fluid flow from setter shutoff valve 215. Setter upstream connector 220 is shaped to receive the center bar upstream end 105A of the apparatus 100. Center bar downstream end 105B is connected to setter downstream connector 225 to permit fluid to flow from the apparatus 100 at the opening at center bar downstream end 105B into the setter.

Setter downstream connector 225 receives center bar downstream end 105B and allows fluid to flow through setter backflow preventer 230, through setter downstream conduit 235, and out of the setter 200 at setter outtake 420.

First meter upstream end 405 is received by the first meter upstream connector 140 of the apparatus 100. For example, first meter upstream end 405 may be threaded and sized to be received and to be screwed into first meter upstream connector 140. First meter downstream end 415 is connected to first meter downstream connector 160 in a similar manner, such as through a threaded end of first meter downstream end 415 that may be received by first meter downstream connector 160. When both setter shutoff valve 215 and first shutoff valve 130 are positioned to allow fluid flow, fluid may enter the setter at setter intake 205, flow through setter upstream conduit 210, into the apparatus 100 at center bar upstream end 105A, through first upstream conduit 120, and into the first meter 400 at first meter upstream end 405. The fluid flow may be measured in the first meter housing 410, then the fluid may flow out of the first meter at first meter downstream end 415, through the first downstream conduit 165, and out of the apparatus 100 at secondary downstream outlet 170. By passing though first meter 400, the flow of water out of secondary downstream outlet 170 may be measured.

Second meter upstream end 305 is received by the second meter upstream connector 135 of the apparatus 100. For example, second meter upstream end 305 may be threaded and receivable by a threaded interior of second meter upstream connector 135. Second meter housing 310 may include one or more components to measure flow of fluid, such as water, through second meter 300. Second meter downstream end 315 is connected to the second meter downstream connector 155 in a similar manner as second meter upstream end 305 and second meter upstream connector 135. Second meter downstream end 315 and second meter downstream connector 155 may be connected to allow fluid to flow through second meter 300, out of an opening on the end of second meter downstream end 315, through second meter backflow preventer 150, through second meter downstream conduit 190, and out of the apparats at center bar downstream end 105B. When connected to setter 200, fluid may flow into the setter 200 at setter downstream connector 225, through setter downstream conduit 235, and out of the setter 200 at setter outtake 420.

As an example, setter 200 may be initially installed such that setter intake 205 is connected to a water main and setter outtake 420 is connected to a customer of a water company whose water usage is being measured by a meter that is connected from setter upstream connector 220 to setter downstream connector 225. If a second meter and second outtake is required, the meter can be replaced with the apparatus 100. For example, setter shutoff valve 215 may be positioned to restrict fluid flow, the original meter may be removed, and the apparatus 100 may be secured in place of the original meter. First meter 400 and second meter 300 may be connected to the apparatus 100 as shown in FIG. 3, and the setter shutoff valve 215 may be repositioned to allow fluid flow. Secondary downstream outlet 170 may then be connected to the second required destination for the metered water. In this configuration, second meter 300 may measure the flow to the original destination (the destination connected to setter outtake 420), and first meter 400 may measure the flow to the secondary downstream outlet 170. This is beneficial because a second meter may be installed with only shutting off water flow to the first destination and not requiring shutting off the water main, connecting a second setter to the water main, and connecting the second meter to the second setter.

In some implementations, one or both of the meters may be permanently attached to the apparatus 100. For example, the apparatus may not include first meter upstream connector 140 and first meter downstream connector 160, but instead the first meter 400 may be connected permanently connected to first shutoff valve 130 and to first downstream conduit 165. Likewise, second meter 300 may be permanently connected to the apparatus without connectors on each end.

In some implementations, an original meter that was connected to setter 200 may be reused as first meter 400 or second meter 300. For example, a meter may be disconnected from the setter 200, the apparatus 100 may be installed as illustrated in FIG. 3, and the original meter may be connected to the apparatus as second meter 300. In this manner, the primary flow is still measured by the same meter as was originally measuring flow the setter 200. A second new meter may be connected as first meter 400 to measure fluid flow from the secondary downstream outlet 170.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus for multiple meter installation, comprising:
a center bar having an upstream end and a downstream end;
a splitter at said upstream end of said center bar, said splitter having an upstream portion in flow communication with a first downstream portion and a second downstream portion at any time during operation;
a first meter upstream connector in flow communication with said first downstream portion of said splitter;
a second meter upstream connector in flow communication with said second downstream portion of said splitter;
a first meter downstream connector and a second meter downstream connector, one of said first and second meter downstream connectors connected at said downstream end of said center bar, and the other of said first and second meter downstream connectors spaced from one of said first and second meter upstream connector;
a connection located at said downstream end of said center bar, said connection in fluid communication with one of said first and second meter downstream connectors, the other of said first and second meter downstream connectors being spaced from said connection.

2. An apparatus, comprising:
a center bar having an upstream end and a downstream end, said center bar sized such that a distance from said upstream end to said downstream end is about the size of an existing meter setter;
a splitter, said splitter having a single upstream portion which is in flow communication at any time of operation with a first downstream portion and a second downstream portion, wherein said splitter is connected to said upstream end of said center bar;
a first meter upstream connector, said first meter upstream connector connected to said first downstream portion of said splitter by a first upstream conduit;
a first meter downstream connector, said first meter downstream connector connected to a first end of a first meter downstream conduit, said first meter downstream connector positioned such that a first meter is connectable between said first meter upstream connector and said first meter downstream connector;
a second meter upstream connector, said second meter upstream connector connected to said second downstream portion of said splitter by a second upstream conduit;
a second meter downstream connector, said second meter downstream connector positioned such that a second meter is connectable between said second meter upstream connector and said second meter downstream connector; and
a second meter downstream conduit having a first end and a second end, said first end of said second meter downstream conduit connected to said second meter downstream connector, and said second end of said second meter downstream conduit attachable to a secondary downstream outlet.

3. The apparatus of claim 2, wherein said first meter is an original meter previously connectable between an upstream connector of a setter and a downstream connector of said setter.

4. The apparatus of claim 3, where said second meter downstream conduit is positioned such that said second end of said second meter downstream conduit is parallel to a setter output of said setter.

5. The apparatus of claim 2, further comprising:
a brace, said brace connected to said center bar and attached so that said distance between said second meter upstream connector and said second meter downstream connector is a preselected length.

6. The apparatus of claim 2, further comprising:

a first connected meter, said first connected meter having a first meter upstream end and a first meter downstream end, said first meter upstream end connected to said first meter upstream connector, and said first meter downstream end connected to said first meter downstream connector.

7. The apparatus of claim 6, further comprising:

a second connected meter, said second connected meter having a second meter upstream end and a second meter downstream end, said second meter upstream end connected to said second meter upstream connector, and said second meter downstream end connected to said second meter downstream connector.

8. The apparatus of claim 2, further comprising:

a first meter shutoff valve, said first meter shutoff valve positionable to restrict fluid flow from an intake of said first meter shutoff valve to an outtake of said first meter shutoff valve, said first meter shutoff valve connected between said first downstream portion of said splitter at said shutoff valve intake and said first meter upstream connector at said outtake of said first meter shutoff valve, wherein at least one position of said first meter shutoff valve allows fluid to flow from said first downstream portion of said splitter to said first meter upstream connector, and wherein at least one position of said first meter shutoff valve restricts fluid flow from said first downstream portion of said splitter and said first meter upstream connector.

9. The apparatus of claim 8, further comprising:

a second meter shutoff valve, said second meter shutoff valve positionable to restrict fluid flow from an intake of said second meter shutoff valve to an outtake of said second meter shutoff valve, said second meter shutoff valve connected between said second downstream portion of said splitter at said second meter shutoff valve intake and said second meter upstream connector at said outtake of said second meter shutoff valve, wherein at least one position of said second meter shutoff valve allows fluid to flow from said second downstream portion of said splitter to said second meter upstream connector, and wherein at least one position of said second meter shutoff valve restricts fluid flow from said second downstream portion of said splitter and said second meter upstream connector.

10. An apparatus for connection of an additional water meter to a water meter setter, comprising:

a bar having an upstream connector and a downstream connector, said upstream connector in flow communication with said water meter setter and said downstream connector in flow communication with said water meter setter;

a flow splitter in communication with said upstream connector, said flow splitter directing fluid flow at any time of operation through a first flow path having a first water meter and a second flow path having a second water meter;

one of said first and second flow paths moving through a setter outtake of said setter and the other of said first and second flow paths moving through a secondary downstream outlet.

\* \* \* \* \*